United States Patent [19]

Brack

[11] Patent Number: 4,840,641
[45] Date of Patent: Jun. 20, 1989

[54] CATIONIC DIAZACYANINE DYESTUFFS FOR DYEING POLYACRYLONITRILE-WOOL BLENDS

[75] Inventor: Alfred Brack, Odenthal, Fed. Rep. of Germany

[73] Assignee: Bayer Aktiengesellschaft, Leverkusen, Fed. Rep. of Germany

[21] Appl. No.: 176,904

[22] Filed: Apr. 4, 1988

[30] Foreign Application Priority Data

Apr. 15, 1987 [DE] Fed. Rep. of Germany ....... 3712822
Jul. 7, 1987 [DE] Fed. Rep. of Germany ....... 3722322

[51] Int. Cl.$^4$ ...................... C09B 44/18; C09B 67/22
[52] U.S. Cl. .................................... 8/534; 8/639; 8/644; 8/655; 8/927; 534/607; 534/753
[58] Field of Search ................... 8/534, 639, 644, 655; 534/607

[56] References Cited

U.S. PATENT DOCUMENTS

| | | | |
|---|---|---|---|
| 2,883,373 | 4/1959 | Bossard et al. | 534/607 |
| 3,438,963 | 4/1969 | Robbins | 534/589 |
| 4,051,117 | 9/1977 | Kuhlthau et al. | 534/607 |
| 4,264,496 | 4/1981 | Durant | 534/607 |

Primary Examiner—A. Lionel Clingman
Attorney, Agent, or Firm—Sprung Horn Kramer & Woods

[57] ABSTRACT

Cationic diazacyanine dyestuffs of the formula

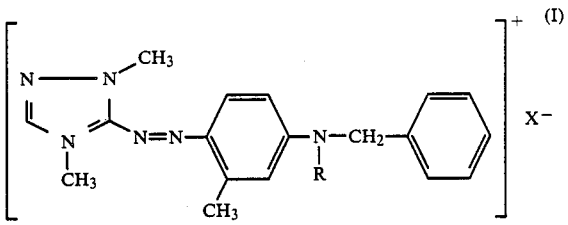

and their mixtures with the isomeric dyestuffs of the formula

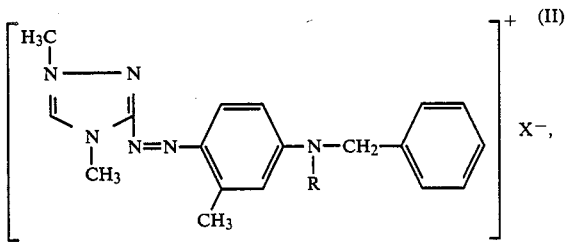

wherein
R represents methyl or ethyl and
$X^-$ represents a colorless anion, are suitable for dyeing polyacrylonitrile and, in particular, polyacrylonitrile-wool mixtures.

5 Claims, No Drawings

CATIONIC DIAZACYANINE DYESTUFFS FOR DYEING POLYACRYLONITRILE-WOOL BLENDS

The invention relates to cationic diazacyanine dyestuffs of the formula

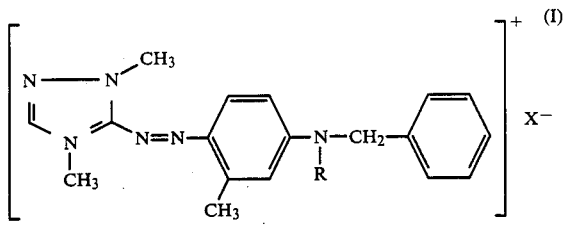

wherein
R represents methyl or ethyl and
X⁻ represents a colourless anion, their mixtures with the isomeric dyestuffs of the formula

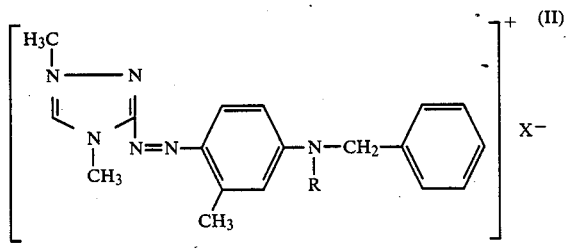

wherein
R and X⁻ have the abovementioned meaning, and a process for dyeing polyacrylonitrile and polyacrylonitrile-wool mixtures using these dyestuffs.

Preferred anions are methosulphate, bisulphate, chloride, bromide and chlorozincate.

Cationic diazacyanine dyestuffs which are obtained by coupling diazotized 3-amino-1,2,4-triazole with an alkyl-benzyl-aniline and subsequently quaternizing the product and are known, for example, from U.S. Pat. Specification Nos. 2,883,373 and 3,438,963 are widely used for dyeing polyacrylonitrile. However, they have only a limited stability towards hydrolyzing and reducing influences in the dyebath. In particular, such influences lead to partial destruction of the dyestuff in the dyeing of polyacrylonitrile/wool mixtures.

It has now been found, surprisingly, that the dyestuffs of the formula (I) and their mixtures with the dyestuffs of the formula (II) have a high stability in the dyebath, in comparison with the known dyestuffs, and are excellently suitable for dyeing polyacrylonitrile in polyacrylonitrile-wool mixtures. The methosulphates of the dyestuffs according to the invention are also distinguished by a good crystallization capacity. They also remain free-flowing without the addition of zinc chloride during storage, which is necessary with the abovementioned already known dyestuffs, so that the undesirable pollution of the dyehouse effluent by zinc ions is avoided. On the other hand, these methosulphates are outstandingly soluble in acetic acid-water mixtures, so that storage-stable concentrated liquid grades can be prepared on this basis in a very economical manner. The dyestuffs I where X=CH$_3$SO$_4$— are therefore particularly useful.

The dyestuffs (I) (X=CH$_3$SO$_4$—) are prepared in a known manner by methylation of the azo bases on which they are based with dimethyl sulphate. Isomeric colour salts which differ in the position of one methyl group in the triazole ring are thereby also formed. The methosulphates of the formula (II)(X=CH$_3$SO$_4$—) formed on methylation with dimethyl sulphate can easily be removed from the main isomers, which usually represent a proportion of >80%, on the basis of their water-solubility, which increases sharlpy as the pH decreases. For most fields of use, however, this separation is not necessary and the mixture of the two isomers can be used.

The colour bases and their bisulphates can advantageously be prepared by simultaneous coupling in sulphuric acid using aqueous sodium nitrite solution. However, it is also possible to carry out the diazotization with nitrosylsulphuric acid in a known manner in glacial acetic acid/sulphuric acid or phosphoric acid mixtures. Isolation of the colour bases or a hydrogen salt can be avoided if the simultaneous coupling is carried out with sodium nitrite in acetic acid and methylation with dimethyl sulphate is then carried out. No addition of alkali is necessary here. The sodium acetate formed from the sodium nitrite is sufficient. Ready-to-use solutions of the methosulphates are thus formed in a procedure which is simple and, because of the high space/time yield, economical. If desired, colour salts with different anions X⁻ can also be precipitated from these solutions by addition of, for example, zinc chloride or sodium bromide and can be isolated.

EXAMPLE 1

46.5 g of 3-amino-1,2,4-triazole are dissolved in a mixture of 225 g of concentrated sulphuric acid and 100 g of water. 112.5 g of N-ethyl-N-benzyl-m-toluidine are then added and the mixture is stirred until the solution is homogeneous. A solution of 35 g of sodium nitrite in 100 g of water is then added dropwise at 15°-20° C. through a tube immersed as deeply as possible, in the course of about 50 minutes. After about 4 hours, 1,000 g of water are added dropwise—initially with cooling—at about 20° C. After the mixture has been stirred for several hours, the bisulphate of the formula

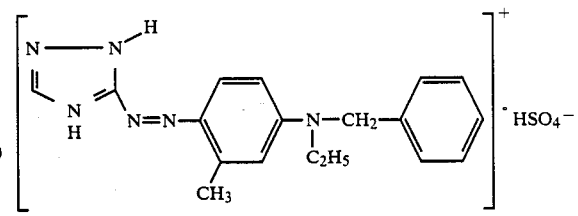

crystallizes out. A press cake which contains 124-125 g of dry azo base is obtained by filtration with suction. The press cake is further processed in the moist state as follows:

The amount corresponding to 185 g of dry azo base is stirred with water in an amount such that a total of 370 g of water are present. To avoid the formation of lumps, 30.8 g of magnesium oxide are introduced at a maximum of 5° C., with thorough cooling. The pH should be 9.5-9.6. 185 g of dimethyl sulphate are added dropwise at 0°-5° C. in the course of 2 hours, the mixture is then stirred at 0°-5° C. for a further 4 hours and the temperature is subsequently allowed to rise to room temperature. When the methylation has ended (thin layer chromatography control), the mixture is heated at 60°-80°

C. for about 1 hour in order to destroy residual dimethyl sulphate. After cooling, 92.5 g of sodium chloride are added and the mixture is stirred at room temperature until crystallization is complete. 200 g of finely crystalline dyestuff which consists to the extent of ≧80% of the dyestuff of the formula I with R=C₂H₅ and X=CH₃SO₄ are obtained. In this procedure, the pH of the filtrate is between 0 and −0.2. If the addition of the sodium chloride is preceded by the addition of sulphuric acid in an amount such that the pH falls to below −1, the dyestuff of the formula I (R=C₂H₅, X=CH₃SO₄) crystallizes out in the virtually pure form. λ max=535 nm.

If the equivalent amount of N-methyl-N-benzyl-m-toluidine is used instead of N-ethyl-N-benzyl-m-toluidine, an otherwise unchanged procedure gives the dyestuff of the formula I where R=CH₃ and X=CH₃SO₄. λ max=526 nm.

EXAMPLE 2

84 g of aminotriazole are stirred with 315 g of acetic acid for about 10 minutes, whereupon the aminotriazole dissolves almost completely. A solution of 66.5 g of sodium nitrite in 105 g of water and 157.5 g of N-ethyl-N-benzyl-m-toluidine is then metered in at 10°–15° C., with thorough mixing, so that only a small excess of nitrite is formed. The nitrite solution is introduced as deeply as possible below the surface through an immersed tube. When the simultaneous coupling has ended, the temperature is slowly increased to 25° C. and 231 g of dimethyl sulphate are added dropwise at 25°–30° C. Gentle cooling is required here. The mixture is stirred at 30° C. for 4 hours, a further 42 g of dimethyl sulphate are added dropwise and the mixture is stirred overnight at room temperature. Thereafter, no further precursor can be detected by chromatography. To destroy residual dimethyl sulphate, the solution is heated at 60°–80° C. for 1 hour and filtered hot. 750 ml=946.7 g of storage-stable dyestuff solution is obtained.

By addition of zinc chloride or a hydrochloric acid solution of zinc chloride the zinc chloride double salt or chlorozincate, and by addition of NaBr the bromide of the dyestuff can be deposited in crystalline form in a yield of 80% (based on ethyl-benzyl-m-toluidine).

We claim:
1. A dyestuff of the formula

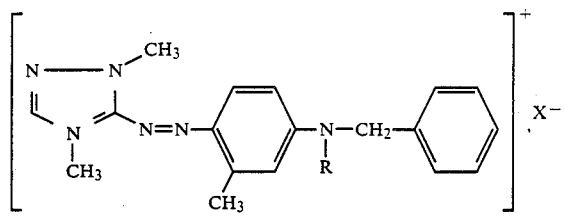

wherein
R represents methyl or ehtyl and
X⁻ represents a colorless anion.
2. A dyestuffs of claim 1, wherein
X⁻ represents methosulphate, hydrogen sulphate, chloride, bromide or chlorozincate.
3. A dyestuffs of claim 1, wherein
X⁻ represents methosulphate.
4. A mixture of dyestuffs according to claim 1 and their isomers of the formula

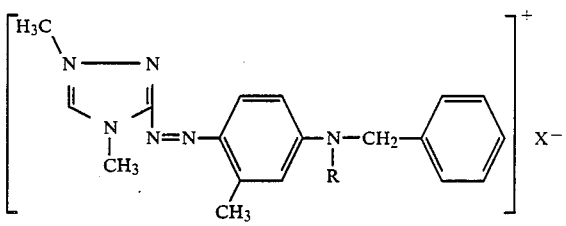

5. Process for dyeing polyacrylonitrile/wool mixtures, characterized in that dyestuffs according to claim 1 are used, if appropriate in mixtures with other dyestuffs.

* * * * *